(12) United States Patent
Bockelmann et al.

(10) Patent No.: US 11,171,834 B1
(45) Date of Patent: Nov. 9, 2021

(54) DISTRIBUTED VIRTUALIZED COMPUTING INFRASTRUCTURE MANAGEMENT

(71) Applicant: Juniper Networks, Inc., Sunnyvale, CA (US)

(72) Inventors: Luke A Bockelmann, Red Bank, NJ (US); Sachchidanand Vaidya, Santa Clara, CA (US); Ram Pratap Yadav, San Jose, CA (US); Amudha Ramachandran, Spring, TX (US)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 16/235,468

(22) Filed: Dec. 28, 2018

Related U.S. Application Data

(60) Provisional application No. 62/768,690, filed on Nov. 16, 2018.

(51) Int. Cl.
*H04L 12/24* (2006.01)
*H04L 12/713* (2013.01)
(Continued)

(52) U.S. Cl.
CPC ...... *H04L 41/0856* (2013.01); *G06F 9/45541* (2013.01); *G06F 9/45558* (2013.01);
(Continued)

(58) Field of Classification Search
CPC ... H04L 41/0856; H04L 41/046; H04L 45/64; H04L 45/586; H04L 41/0893;
(Continued)

(56) References Cited

U.S. PATENT DOCUMENTS 9,444,722 B2 * 9/2016 Mosko ................. H04L 45/123
9,571,394 B1 * 2/2017 Sivaramakrishnan ......................
H04L 45/7453
(Continued)

FOREIGN PATENT DOCUMENTS

WO   WO-2007005924 A1 * 1/2007   ......... G06F 9/45558
WO   2013184846 A1   12/2013

OTHER PUBLICATIONS

Krzysztofgromadzki et al., "Speed-up Synchronization Process," Juniper/Contrail-Vcenter-Manager, retrieved from https://github.com/Juniper/contrail-vcenter-manager/blob/master/cvm/_main_.py on Dec. 27, 2018, 4 pp.
(Continued)

*Primary Examiner* — Joe Chacko
(74) *Attorney, Agent, or Firm* — Shumaker & Sieffert, P.A.

(57) ABSTRACT

A computing device includes processing circuitry coupled to a memory device, and an orchestration agent configured for execution by the processing circuitry. The orchestration agent is an agent of an orchestrator for a computing infrastructure that includes the computing device, wherein the orchestration agent is configured to: detect configuration events from the computing device to determine local configuration state of the computing device; aggregate the local configuration state from the computing device with configuration state from a network controller to generate aggregated configuration state; and store the aggregated configuration state for application to operation of the computing device.

20 Claims, 7 Drawing Sheets

(51) Int. Cl.
*G06F 9/455* (2018.01)
*H04L 12/715* (2013.01)

(52) U.S. Cl.
CPC ........ *H04L 41/046* (2013.01); *H04L 41/0893* (2013.01); *H04L 45/586* (2013.01); *H04L 45/64* (2013.01); *G06F 2009/45587* (2013.01); *G06F 2009/45595* (2013.01)

(58) Field of Classification Search
CPC ............. G06F 9/45558; G06F 9/45541; G06F 2009/45587; G06F 2009/45595
See application file for complete search history.

(56) References Cited

U.S. PATENT DOCUMENTS

| | | | | |
|---|---|---|---|---|
| 2003/0233648 | A1* | 12/2003 | Earl | G06F 8/65 717/176 |
| 2010/0287548 | A1* | 11/2010 | Zhou | G06F 9/4856 718/1 |
| 2013/0332602 | A1* | 12/2013 | Nakil | H04L 45/38 709/224 |
| 2014/0115228 | A1* | 4/2014 | Zhou | G06F 9/45533 711/102 |
| 2014/0129700 | A1* | 5/2014 | Mehta | G06F 11/3636 709/224 |
| 2014/0310408 | A1* | 10/2014 | Kirner | H04L 41/145 709/224 |
| 2018/0157384 | A1* | 6/2018 | Baneva | G06F 9/451 |
| 2018/0278541 | A1* | 9/2018 | Wu | H04L 47/76 |

OTHER PUBLICATIONS

Krzysztofgromadzki et al., "Speed-up Synchronization Process," Juniper/Contrail-Vcenter-Manager, retrieved from https://github.com/Juniper/contrail-vcenter-manager/blob/master/cvm/clients.py on Dec. 27, 2018, 11 pp.

Krzysztofgromadzki et al., "Retring Set VLAN ID Task in vCenter," Juniper/Contrail-Vcenter-Manager, retrieved from https://github.com/Juniper/contrail-vcenter-manager/blob/master/cvm/constants.py on Dec. 27, 2018, 2 pp.

Krzysztofgromadzki et al., "Speed-up Synchronization Process," Juniper/Contrail-Vcenter-Manager, retrieved from https://github.com/Juniper/contrail-vcenter-manager/blob/master/cvm/controllers.py on Dec. 27, 2018, 6 pp.

Szczepanski et al., "Update VLAN ID Assignment Logic," Juniper/Contrail-Vcenter-Manager, retrieved on https://github.com/Juniper/contrail-vcenter-manager/blob/master/cvm/database.py on Dec. 27, 2018, 2 pp.

Szczepanski et al., "Fix Non-Contrail VMs Handling," Juniper/Contrail-Vcenter-Manager, retrieved on https://github.com/Juniper/contrail-vcenter-manager/blob/master/cvm/models.py on Dec. 27, 2018, 5 pp.

Krzysztofgromadzki et al., "Split Reading and Handling Events into Two Greenlets," Juniper/Contrail-Vcenter-Manager, retrieved on https://github.com/Juniper/contrail-vcenter-manager/blob/master/cvm/monitors.py on Dec. 27, 2018, 1 pp.

Krzysztofgromadzki et al., "Add Greenlet Traceback to CVM Introspect," Juniper/Contrail-Vcenter-Manager, retrieved from https://github.com/Juniper/contrail-vcenter-manager/blob/master/cvm/sandesh_handler.pyon Dec. 27, 2018, 3 pp.

Krzysztofgromadzki et al., "Speed-up Synchronization Process," Juniper/Contrail-Vcenter-Manager, retrieved from https://github.com/Juniper/contrail-vcenter-manager/blob/master/cvm/services.py on Dec. 27, 2018, 9 pp.

"PCI-SIG SR-IOV Primer: An Introduction to SR-IOV/ Technology," Rev. 2.5, Intel Corp., Jan. 2011, 28 pp.

Krzysztofgromadzki et al., "Handling ManagedObjectNotFound errors," Juniper/Contrail-Vcenter-Manager, retrieved from https://github.com/Juniper/contrail-vcenter-manager/blob/master/cvm on Nov. 16, 2018,11 pp.

Krzysztofgromadzki et al., "Handling ManagedObjectNotFound errors," Juniper/Contrail-Vcenter-Manager, retrieved from https://github.com/Juniper/contrail-vcenter-manager/tree/master/cvm on Nov. 16, 2018, 6 pp.

Mackie et. al, "BGP-Signaled End-System IP/VPNs," draft-ietf-l3vpn-end-system-06, Dec. 15, 2016, 31 pp.

Rosen et al., "BGP/MPLS IP Virtual Private Networks (VPNs)," Network Working Group, RFC 4364, Feb. 2006, 47 pp.

"Installing and Provisioning VMware vCenter with Contrail" Juniper Networks, Inc., Contrail, Tech Library, Apr. 23, 2018, retrieved from lhttps://www.juniper.net/documentation/en_US/contrail5.0/topics/task/configuration/vcenter-integration-vnc.html, last accessed Dec. 28, 2018, 6 pp.

* cited by examiner

DISTRIBUTED VIRTUALIZED COMPUTING INFRASTRUCTURE MANAGEMENT

This application claims the benefit of U.S. Provisional Patent Application No. 62/768,690, filed on Nov. 16, 2018, the entire content of which is incorporated herein by reference.

TECHNICAL FIELD

The disclosure relates to a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively used virtualized environments in which virtual hosts, such as virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtualized computing environments, such as containers or virtual machines, as well as among applications running on legacy (e.g., physical) environments. Software-defined networking contributes to network management.

SUMMARY

In general, techniques are described for distributed virtualized computing infrastructure management. In particular, the disclosure describes distributed orchestration agents, executing on hosts of computing infrastructure, for an orchestrator of virtualized computing environments. The orchestrator processes configuration events driven by an operator to add, move or change virtual machines (VMs) and compute nodes in a cluster of host computing devices. A network controller may also process configuration events and communicate with the orchestrator. Events created by the orchestrator are driven by the operator via an interface, such as an API or GUI, into the orchestrator. After the configuration events are created in the orchestrator, the configuration events are propagated to all hosts that host the tenant VMs affected by this change. The VMs may execute on bare-metal hypervisors or other elements for hosting virtual machines. The distributed orchestration agents may each be executed as a corresponding container in a particular VM, associated with the network controller, that is deployed in the corresponding host. The orchestration agent listens to the stream of events that occur on a local host and ensure the necessary configuration for the tenant VMs on that local host are maintained.

Interesting scenarios may occur when distributed resource scheduler (DRS) or high availability (HA) events occur when the destination host is put under maintenance or is unreachable because of power-off or reboot, and the network controller maintains the configuration state. This complex system requires compiling both local information from the local host as well as information maintained centrally in the orchestrator. The orchestrator may also process information from the network controller nodes which represent the "source of truth" for network configuration for the virtualized computing infrastructure. The distributed orchestration agents on the compute nodes allow for aggregating configuration state for both the local network device virtualization platform and the network controller in a distributed fashion.

In one example, this disclosure describes a computing device that includes processing circuitry coupled to a memory device; an orchestration agent configured for execution by the processing circuitry, wherein the orchestration agent is an agent of an orchestrator for a computing infrastructure that includes the computing device, wherein the orchestration agent is configured to: detect configuration events from the computing device to determine local configuration state of the computing device; aggregate the local configuration state from the computing device with configuration state from a network controller to generate aggregated configuration state; and store the aggregated configuration state for application to operation of the computing device.

In a further example, a method comprises detecting, by an orchestration agent of a computing device, configuration events from the computing device to determine local configuration state of the computing device, wherein the orchestration agent operates as an agent of an orchestrator for a computing infrastructure that includes the computing device; aggregating, by the orchestration agent, the local configuration state from the computing device with configuration state for the computing device from a network controller to generate aggregated configuration state for the computing device; and storing, by the orchestration agent, the aggregated configuration state for application to operation of the computing device.

In another example, this disclosure describes a system comprising an orchestrator for a virtualized computing infrastructure comprising virtual execution elements executing on a plurality of computing devices; a network controller to configure one or more virtual networks for the virtualized computing infrastructure; a first computing device of the plurality of computing devices, the first computing device comprising: first processing circuitry coupled to a first memory device; a bare metal hypervisor configured to host first one or more virtual machines; and a first orchestration agent configured for execution by the first processing circuitry, wherein the orchestration agent is configured to receive first virtual machine information from the orchestrator and to send, to the network controller, first virtual network information for at least one of respective virtual machine interfaces of the first one or more virtual machines; and a second computing device of the plurality of computing devices, the second computing device comprising: second processing circuitry coupled to a second memory device; a bare metal hypervisor configured to host second one or more virtual machines; and a second orchestration agent configured for execution by the second processing circuitry, wherein the second orchestration agent is configured to receive second virtual machine information from the orchestrator and to send, to the network controller, second virtual network information for at least one of respective virtual machine interfaces of the second one or more virtual machines.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
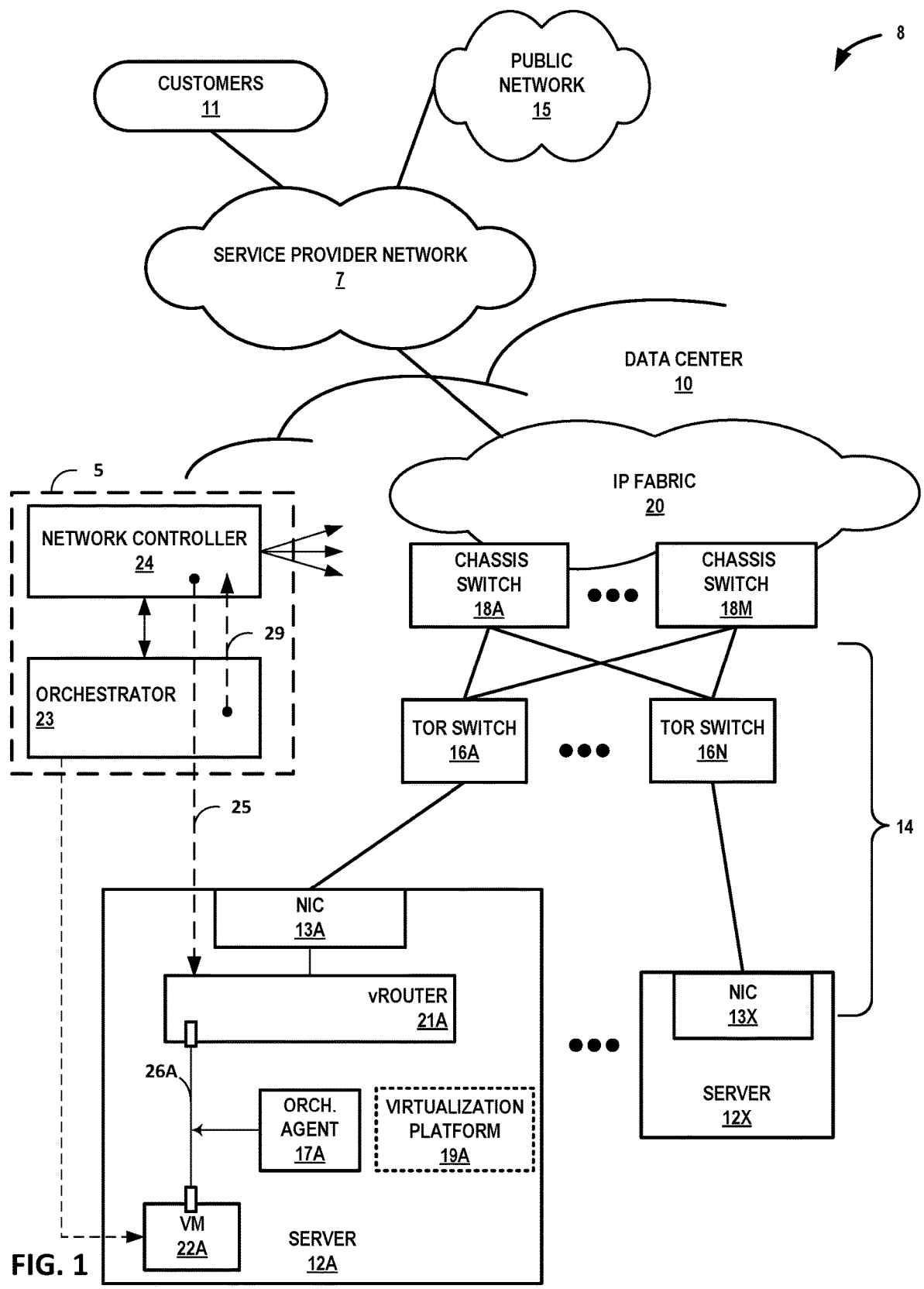
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. Gateway routers or switches that connect a virtual network to a physical network are an exception and may contain tenant MAC or IP addresses.

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of VM 22A. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21.

As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server.

For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., VM 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a virtualized infrastructure orchestration platform that provides a VM-centric infrastructure for automating deployment, scaling, and operations of VMs to provide a VM-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. VM orchestration, specifically, permits VM coordination and refers to the deployment, management, scaling, and configuration, e.g., of VMs to host servers by a virtualized infrastructure orchestration platform. Example instances of orchestration platforms, including in the context of containers or virtual machines, include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Orchestrator 23 and network controller 24 together implement a controller 5 for the computing infrastructure 8. Orchestrator 23 and network controller 24 may execute on separate computing devices or execute on the same computing device. Each of orchestrator 23 and network controller 24 may be a distributed application that executes on one or more computing devices.

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include VM-centric computing infrastructure.

In one example, VM 22A is an example of a virtual network endpoint. Server 12A includes a virtualization platform 19A for running VM applications, such as those of VM 22A. Virtualization platform 19A receives requests from orchestrator 23 to obtain and host, in server 12A, VMs. Virtualization platform 19A obtains and executes the VMs.

Virtualization platform 19A communicates with an orchestration agent 17A (e.g., a Contrail vCenter Manager (CVM)) that listens to configuration events on compute nodes (e.g., server 12A) and aggregates configuration information from multiple sources. The virtualization platform 19A uses orchestration agent 17A to manage configuration information, including VM 22A. For example, the orchestration agent 17A assists with migration of VMs from one server 12 to another in a way that ensures network controller 24 can communicate with VMs. Orchestration agent 17A also connects VMs to virtual router 21A and enables the VMs to communicate, via the virtual network interfaces, to other virtual network endpoints over the virtual networks. Orchestration agent 17A may assign a network address (e.g., a virtual IP address for the virtual network) and may set up routes for the virtual network interface.

Orchestration agent 17A may represent a library, a plugin, a module, a runtime, or other executable code for server 12A. A different instance of orchestration agent 17A may be executed by a virtual machine dedicated on each host for communicating with the network controller 24 to configure virtual networks for the virtual computing infrastructure and providing virtual network interface configuration data to the orchestrator 23 and/or network controller 24. Orchestration agent 17A may be a container in a VM executing on server 12A.

Virtual network interface 26A may represent a virtual ethernet ("veth") pair, where each end of the pair is a separate device (e.g., a Linux/Unix device), with one end of the pair assigned to VM 22A and one end of the pair assigned to virtual router 22A. The veth pair or an end of a veth pair are sometimes referred to as "ports". Virtual network interface 26A may alternatively represent a MAC VLAN network with media access control (MAC) addresses assigned to the VM 22A and to the vrouter 21A for communications between containers of VM 22A and vrouter 21A. Virtual network interface 26A may alternatively represent a different type of interface between virtual router 21A or other network virtualization entity and virtual network endpoints. Virtual network interface 26A may alternatively be referred to as virtual machine interfaces (VMIs), pod interfaces, container network interfaces, tap interfaces, veth interfaces, or simply network interfaces (in specific contexts), for instance.

In the example server 12A of FIG. 1, VM 22A is a virtual network endpoint in a virtual network. Orchestrator 23 may store or otherwise manage configuration data for application deployments that specifies the virtual network and specifies that VM 22A is a virtual network endpoint of the virtual network. Orchestrator 23 may receive the configuration data from a user, operator/administrator, or other machine system, for instance.

As part of the process of creating VM 22A, orchestrator 23 sends request 29 to request that network controller 24 create the virtual network interface for the virtual network (indicated in the configuration data). Network controller 24 processes request 29 to generate interface configuration data 25 for virtual network interface 26A for VM 22A. Interface configuration data 25 may include a unique identifier and a list or other data structure specifying, for virtual network interface 26A, network configuration data for configuring the virtual network interface. Network configuration data for a virtual network interface may include a network name, assigned virtual network address, MAC address, and/or domain name server values. Network controller 24 sends interface configuration data 25 to server 12A and, more specifically in some cases, to virtual router 21A. To configure virtual network interface 26A for VM 22A, virtualization platform 19A may, in some implementations, invoke an orchestration agent 17A. In some examples, orchestration agent 17A listens for configuration events occurring on server 12A, and takes action in response to information obtained from the configuration events.

In some examples, orchestration agent 17A obtains and processes the interface configuration data 25. For each virtual network interface specified in the interface configuration data 25, the orchestration agent 17A may initiate creating virtual network interface 26A. The term "invoke" may refer to the instantiation, as executable code, of a software component or module in memory (e.g., user space 245) for execution by microprocessor 210.

In accordance with the techniques of the disclosure, orchestration agent 17A is one of a plurality of distributed orchestration agents, executing on hosts of computing infrastructure (servers 12), for an orchestrator 23 of virtualized computing environments. The orchestrator 23 processes configuration events driven by an operator to add, move or change virtual machines (VMs) 22 and compute nodes in a cluster of host computing devices. A network controller 24 may also process configuration events and communicate with the orchestrator. Events created by the orchestrator 23 are driven by the operator via an interface, such as an API or GUI, into the orchestrator 23. After the configuration events are created in the orchestrator 23, the configuration events are propagated to all hosts that host the VMs affected by this change. The distributed orchestration agents may each be executed as a corresponding container in a particular VM (not shown in FIG. 1), associated with the network controller 24, that is deployed in the corresponding host. The orchestration agent 17A listens to the stream of events that occur on a local host and ensures the necessary configuration for the tenant VMs 22 on that local host are maintained.

Figure 2:
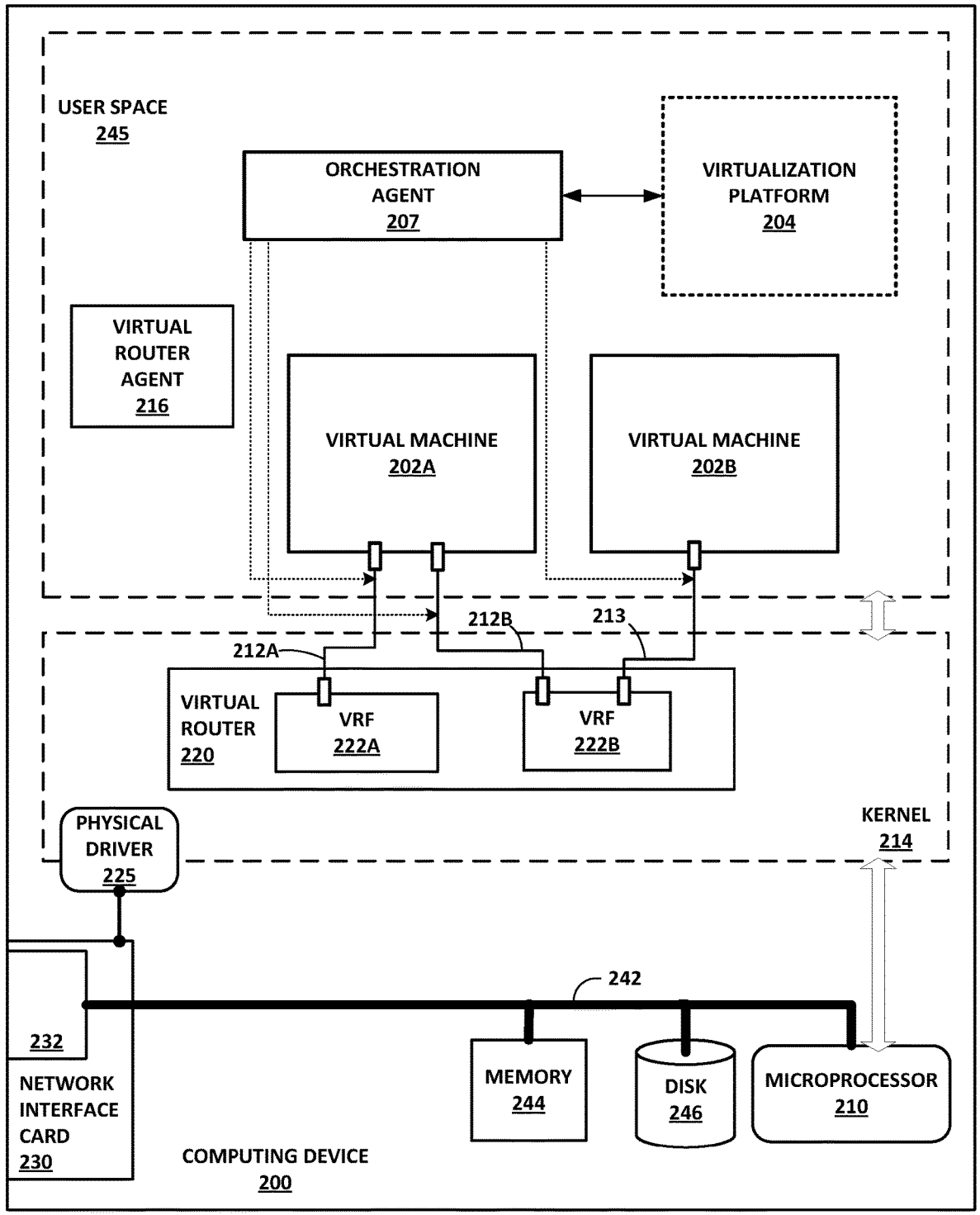
FIG. 2 is a block diagram of an example computing device for a virtualized computing environment in accordance with the techniques described in this disclosure.

FIG. 2 is a block diagram of an example computing device (e.g., host) according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

In some examples, virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing.

Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In general, each of VMs 202A-202B may be assigned one or more virtual network addresses (e.g., IP addresses) for use within respective virtual networks, where each of the virtual networks may be associated with a different virtual subnet provided by virtual router 220. VM 202B may be assigned its own virtual layer three (L3) IP address, for example, for sending and receiving communications but may be unaware of an IP address of the computing device 200 on which the VM 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to create virtual networks and configure network virtualization endpoints, such as computing device 200 and, more specifically, virtual router 220, as a well as virtual network interfaces 212, 213. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the VMs 202 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or decapsulation of virtual network packets within physical network packets may be performed by virtual router 220. This functionality is referred to herein as tunneling and may be used to create one or more overlay networks. Besides IP-in-IP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any of VMs 202, and virtual router 220 exchanges packets with VMs 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to VM 202A in response.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of VMs 202 to cause the virtual machines 224 to use virtual router 220 as an initial next hop for outbound packets. In some examples, NIC 230 is configured with one or more forwarding rules to cause all packets received from virtual machines 224 to be switched to virtual router 220.

VMs 202A-202B may represent example instances of VM 22A of FIG. 1, in further detail. Virtualization platform 204 may represent an example instance of virtualization platform 19A of FIG. 1, in further detail. Virtualization platform 204 include orchestration agent 207, and network modules 206A-206B. Orchestration agent 207 may represent an example instance of orchestration agent 17A of FIG. 1.

Orchestration agent 207 includes code executable by microprocessor 210. Orchestration agent 207 may be one or more computer processes. Orchestration agent 207 may represent a Contrail vCenter Manager (CVM). Orchestration agent 207 aggregates configuration information associated with an orchestrator, e.g., orchestrator 23 of FIG. 1, and a network controller, such as network controller 24. One or more of orchestration agent 207 and virtual router agent 216 may be executed by one of virtual machines 202.

In accordance with techniques described herein, orchestration agent 207 listens to the stream of events that occur on a compute node, such as computing device 200, and ensures that necessary configuration for the VMS 202 on the compute node are maintained.

The techniques of this disclosure enable orchestration agent 207 to communicate changes to the virtualization platform and determine corresponding changes needed in the network controller to provide the solution the virtualization platform offers. The techniques of this disclosure may be useful in a large virtualized infrastructure deployment.

Orchestration agent 207 processes configuration events driven by the operator to add, move or change Virtual Machines (VMs) to or between compute nodes in a virtualization infrastructure Cluster. A network controller (e.g., network controller 24) also processes configuration events and configures VMs on computing device 200. Events created by a virtualization infrastructure management center (orchestrator 23) are driven by the operator either via API or a virtualization infrastructure management graphical user interface (GUI). After the configuration events are created in virtualization infrastructure management center, the configuration events are propagated to all compute nodes that contain the VMs affected by this change. In some examples, orchestration agent 207 operates as a distributed plugin, such as a Contrail vCenter Manager (CVM) plugin. For example, orchestration agent 207 may exist as a container in every network controller-associated infrastructure VM that is deployed in the compute nodes. Virtualization platform 204 provides a platform for managing virtualization of compute resources of device 200 to enable virtual machine hosting. Network controller-associated data plane components (vRouter 220) run inside a network controller-associated virtual machine (not shown in FIG. 2) in computing device 200. Orchestration agent 207 listens to the stream of events that occur on the local compute node. For example, orchestration agent 207 may subscribe to events published by the virtualization platform 204. In a distributed manner, orchestration agent 207 ensures that necessary configuration for the VMs on that compute node are maintained.

Interesting scenarios can occur when distributed resource scheduler (DRS)/High Availability (HA) events occur, when the destination compute node is put under maintenance, or is unreachable because of power-off or reboot, and network controller 254 maintains the configuration state. In this complex system, orchestration agent 207 compiles both local information from the compute nodes as well as information centrally in a virtualization infrastructure management center and by network controller. Orchestration agent 207 also needs to process information from the network controller 254 which represent the source of truth for network configurations in the computing infrastructure. In this manner, the techniques of this disclosure enable aggregation of configuration state from both virtualization infrastructure orchestrator 253 and network controller 254 in a distributed fashion.

The techniques of this disclosure allow for handling DRS/HA events when they occur in a virtualized infrastructure management system orchestrator environment (e.g., provided by orchestrator 23, 253. Configuration events may be initiated by a virtualized infrastructure management system, e.g., orchestrator 253. This provides tighter integration with virtualized infrastructure management systems.

Integrating an SDN controller system with a virtualized infrastructure management system as described herein may provide one or more advantages. For example, the system is scalable, in that orchestration agent 207 may represent a distributed plugin that scales as the number of compute nodes increases. As another example, orchestration agent 207 provides resiliency to maintain configuration by network controller 254 during distributed resource scheduling and high availability events.

As a further example, the techniques of this disclosure provide a tight integration with the virtualized infrastructure management system, in which the orchestration agent 207 executes on a controller-associated VM that is treated by virtualization platform 204 more like infrastructure and not a tenant VM like VMs 202A, 202B. The VM in which the vCenter distributed plugin sits is not simply treated as just another tenant VM from the virtualized infrastructure management system's point of view, but rather is prioritized as an infrastructure VM.

As another potential advantage, using the orchestration agent 207 distributed plugin described herein does not force the SDN controller operator to use a PVLAN pair/VN.

Orchestration agent 207 listens to configuration events on local compute nodes, calls VNC APIs for Contrail Config changes VMIs that are locally significant, and makes configuration changes for the distributed virtual switch (DVS) to ensure micro-segmentation.

An ESX Agent Manager (EAM) provides an integrated provisioning model: auto-deploy the provisioning of infrastructure VM 262, provide "more privileges" to infrastructure VM 262, and monitor/health status of infrastructure VM 262 and EAM has an object model.

Figure 3:
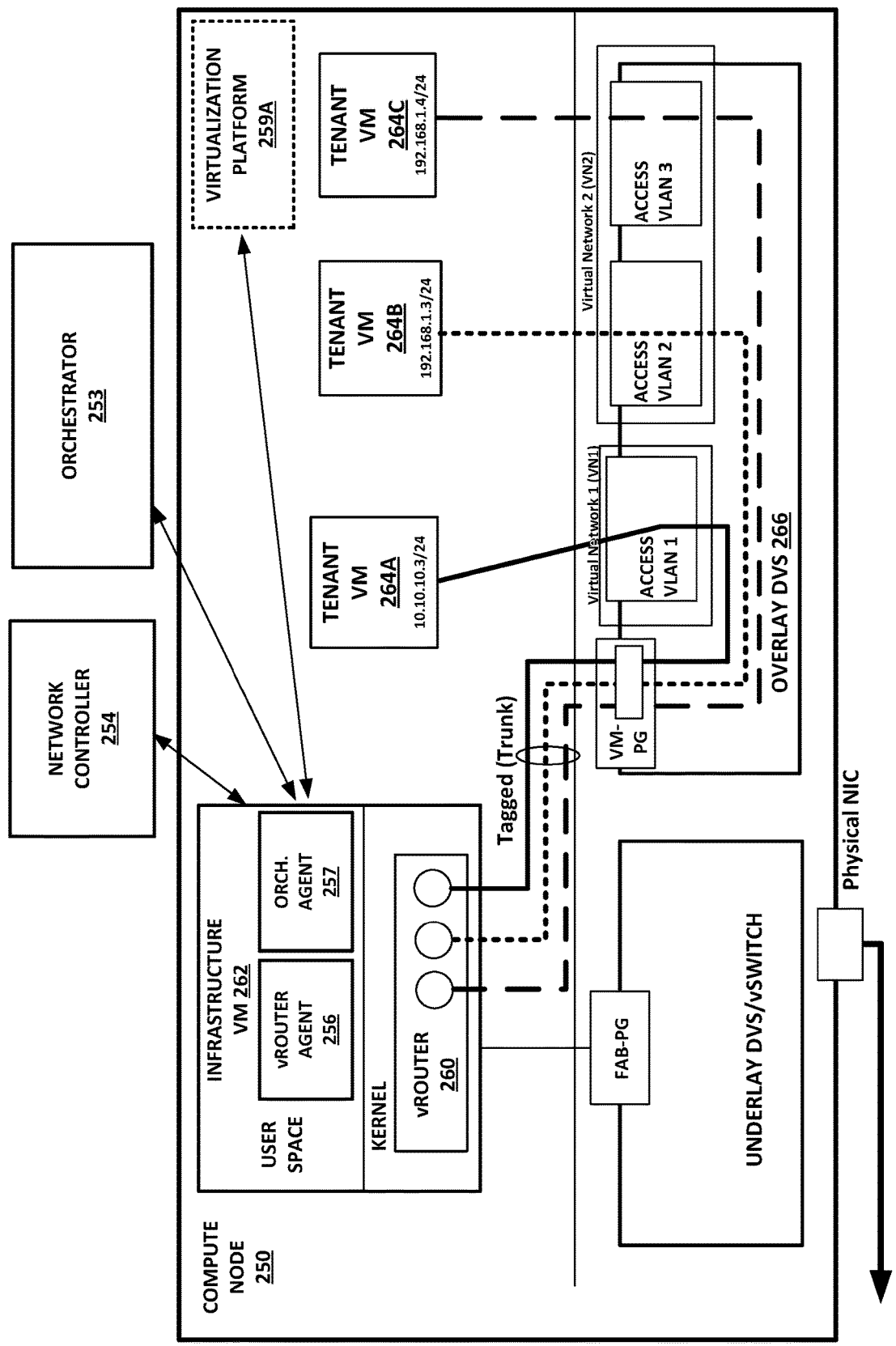
FIG. 3 is a block diagram of an example system including an example compute node shown in further detail according to techniques described in this disclosure.

FIG. 3 is a block diagram of an example system including an example compute node 250 shown in further detail according to techniques described in this disclosure. Compute node 250 is configured with a virtual machine associated with network controller 254, referred to herein as an infrastructure VM 262, which forms the compute personality while performing controller installations. Infrastructure VM 262 may be an Ubuntu-based virtual machine, for example. The infrastructure VM 262 is set up and provisioned by network controller 254. There is one infrastructure VM running on each compute node (e.g., ESXi host represented by servers 12 of FIG. 1).

Orchestration agent 257 may be implemented as a container on every infrastructure VM associated with the network controller 254. Orchestration agent 257 listens to the stream of events occurring on the local compute nodes as well as determining what configuration is being done by orchestrator 253 in making local DVS configuration changes on compute node 250. Orchestration agent 257 calls VNC APIs to configure networks and port configurations of the VMs on the local compute node, and makes a local decision to allocate a unique VLAN from the local pool for each VMI. When there is a DRS/HA event, the destination compute node(s) get VM Registration event notified from orchestrator 253. As a result, the local orchestration agent 257 makes the appropriate VNC API calls to move the VMI from the old compute node to the local compute node to ensure the VM(s) get the same IP address/VMI configuration, etc.

Rather than centrally tracking what orchestrator 253 is doing and changing what network controller 254 does to support what the orchestrator 253 is doing, orchestration agent 257 is a distributed plugin installed in the infrastructure VM 262 of each of the computes that are running the system (e.g., on each of servers 12 of FIG. 1). Each of the orchestration agents 257 has a unique role and responsibility and domain that is local to the compute node that the orchestration agent is on. In this model, the configuration authority is delegated to the orchestration agent plugin to only be locally significant to the compute for which orchestration agent 257 is responsible. Instead of one configuration node controlling hundreds of computes, in this model hundreds of orchestration agent 257 plugins each responsible for the compute on which the plugin is installed. Here, the interface into orchestrator 253 is different relative to a centralized model, and the roles and responsibilities have been delegated to the orchestration agents 257 on the compute nodes.

Orchestration agent 257 is a container that is part of the application running within that VM within the compute node. To orchestrate the local configuration state of the system, orchestration agent 257 communicates with the local compute node's virtualization platform 259A, and queries the configuration of the entire system by communicating with controller 254.

For certain events that are major changes in the system, such as deletions and more catastrophic changes to the system, orchestration agent 257 learns the events locally, and then does a check and balance with the controller 254 for these events. Example events that orchestration agent 257 listens for on the compute node include VM power on, VM power off, VM delete (e.g., when VM moves from one compute node to another due to some HA scenario, handing off of responsibility). For any type of move, any type of event where there is a sequential transaction needed to handle events, orchestration agent 257 handles coordination of all the networking and security services associated with that VM.

Orchestration agent 257 receives notifications that these events are occurring. For example, a virtualization infrastructure service's SDK can be used to connect orchestration agent 257 to the local compute node 250 to listen to the events. Orchestration agent 257 is configured to trigger off of those events (e.g., based on policies defining actions to occur in response to detecting particular events). Orchestration agent 257 interfaces with controller 254 to make the corresponding changes in contrail so that the VM port (virtual ethernet interface) gets the network it is supposed to keep, the IP address it is supposed to keep, and all of the policy, security, firewalling, that was associated with that port.

In the example of a new tenant VM 264 being created on compute node 250, orchestration agent 257 would receive an indication that a new VM has been moved onto compute node 250 is getting a new VM. Orchestration agent 257 tells the vRouter agent 256 of the new tenant VM, and vRouter agent 256 selects the VLAN for the VM and gives the VLAN information to the orchestration agent 257, which tells virtualization platform 259A what VLAN the VM is supposed to be configured with.

Orchestration agent 257 would also send a message to the network controller 254 and request the network configuration information for that VM and set the network configuration up based on the response. Orchestration agent 257 tells the vRouter agent 256 locally to configure that port for that configuration information from network controller 254.

This process ensures that integrity and separateness of tenant VMs is maintained locally, as well as at the configuration node for network controller 254, as VMs move, are added, and are deleted. Orchestration agent 257 tells VMWare to create the VLAN on the Overlay distributed virtual switch (DVS) 266 so the tenant VMs 264A-264C ("tenant VMs 264") cannot communicate between each other. Communications go through the vRouter 260, where security and firewalling are enforced, so no two tenant VMs 264 can communicate with each other.

Infrastructure VM 262 may be deployed by controller 254 at the deployment phase. An ESX Agent Manager (EAM) is a tool within VMWare that can be used to promote VMs to be treated more like infrastructure and less like tenants. Infrastructure VM 262 is promoted as infrastructure and given additional privileges relative to the virtualization platform 259A of compute node 250. This is important when compute node 250 goes into HA, where the compute node 250 is being powered off, or going into a maintenance mode event. When the compute node 250 goes into a maintenance mode, infrastructure VM 262, e.g., as part of the EAM infrastructure, is always the last VM to be powered off and the first VM to be powered on. In this manner, infrastructure VM 262 is given priority in the compute node 250, to ensure that the tenant VMs 264 are connected at all times, as the tenant VMs 264 depend on the orchestration agent 257 in infrastructure VM 262 for proper configuration.

The ESX Agent Manager (EAM) may be used to automate the process of deploying and managing vSphere ESX agents. EAM provides out-of-the-box integration of agents with vSphere features such as: DRS, AddHost, High Availability, DRM, and maintenance mode. Each of these features can be difficult to individually integrate. EAM allows monitoring the health of ESX agents, and blocks users from performing certain operations on ESX agents that might affect the virtual machines that use them. For example, ESX Agent Manager can prevent an agent VM from being powered off or moved from an ESXi (compute node) host that contains other virtual machines that use that agent.

Some example benefits of EAM include that the EAM provisions ESX agent virtual machines for solutions, monitors changes to the ESX agent virtual machines and their scope in virtualization infrastructure management center Server, reports configuration issues in the ESX agents to the solution, and integrates agent virtual machines with vSphere features such as Distributed Resource Scheduler (DRS), Distributed Power Management (DPM), vSphere High Availability (HA), Maintenance mode, and operations such as adding and removing hosts to and from clusters. The HA feature will power on an ESX Agent VM before any other VMs. If a failover host policy is in use, the HA feature allows Agent VMs to be powered on with the failover hosts. The HA feature does not include ESX Agent VMs in admission control calculations. Therefore, if it is necessary to use a VM that is not included in the slot size for the 'host failures to tolerate' admission control policy, an Agent VM can be used. To take advantage of these special priorities, an ESX Agent VM must be included on each host in a cluster.

Example Workflows are as follows.

Duplicated IP issue workflow: 1. VmRemovedEvent comes for VM A (VM was really deleted), which was handled as vMotion so VMI and instance IP address: 10.10.10.15 left in VNC (Host D1). 2. VmCreatedEvent comes for VM A (recreation of VM). (Host D2) (use old instance IP address 10.10.10.15 from VNC CVM read instance IP using uuid generated from VM name and VN name). 3. CVM restart/sync on Host D1 (removes instance IP address, IP address 10.10.10.15 returns to the pool). 4. VmCreatedEvent comes for VM B (gets same IP as VM A)

Improper VmRemovedEvent handling workflow: 1. VmRemovedEvent for VM A comes to CVM. (VM A was really deleted). 2. CVM asks virtualization infrastructure management center API if VM A still exists. 3. despite that VM A was deleted, virtualization infrastructure management center returns that VM A still exists (virtualization infrastructure management center does not finish VmRemoved handling). 4. CVM does not delete entities in VNC.

Steps CVM connects to ESXi compute node: TCP connection to ESXi compute node has status ESTABLISHED even when network is plug-out during 'WaitForUpdatesEx' and this state does not change.

Steps to get event from ESXi compute node in CVM: 1. creating connection to ESXi compute node: at CVM startup. 2. CVM sync. 3. CVM calls 'WaitForUpdatesEx' and usually receives an 'UpdateSet' object. 4. CVM unwraps Events and PowerStateChange/VmwareToolsChange/GuestNetChange from 'UpdateSet'.

Figure 4:
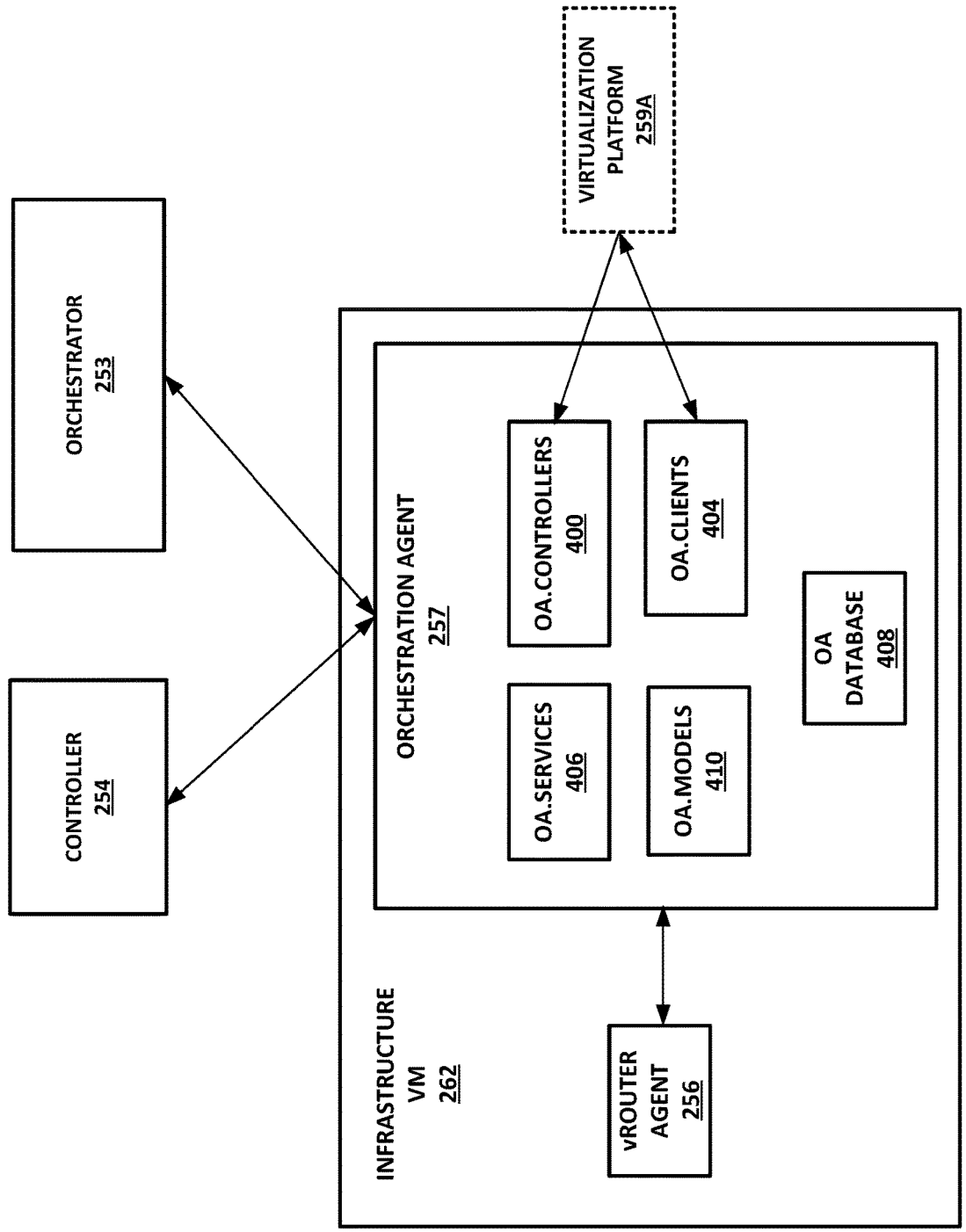
FIG. 4 is a block diagram illustrating an example orchestration agent of the computing device of FIG. 3, according to techniques described in this disclosure.

FIG. 4 is a block diagram illustrating an example orchestration agent of the computing device of FIG. 3 in further detail, according to techniques described in this disclosure.

Orchestration agent 257 may be a container on infrastructure VM 262. OA.controllers thread 400, OA.clients thread 404, OA.services thread 406, OA.models thread 410 represent different threads (processes) that run within the orchestration agent container. OA (orchestration agent) database 408 is a database maintained by orchestration agent 257. Example operation of orchestration agent 257 of FIG. 4 is described with respect to the example of FIG. 5.

Figure 5:
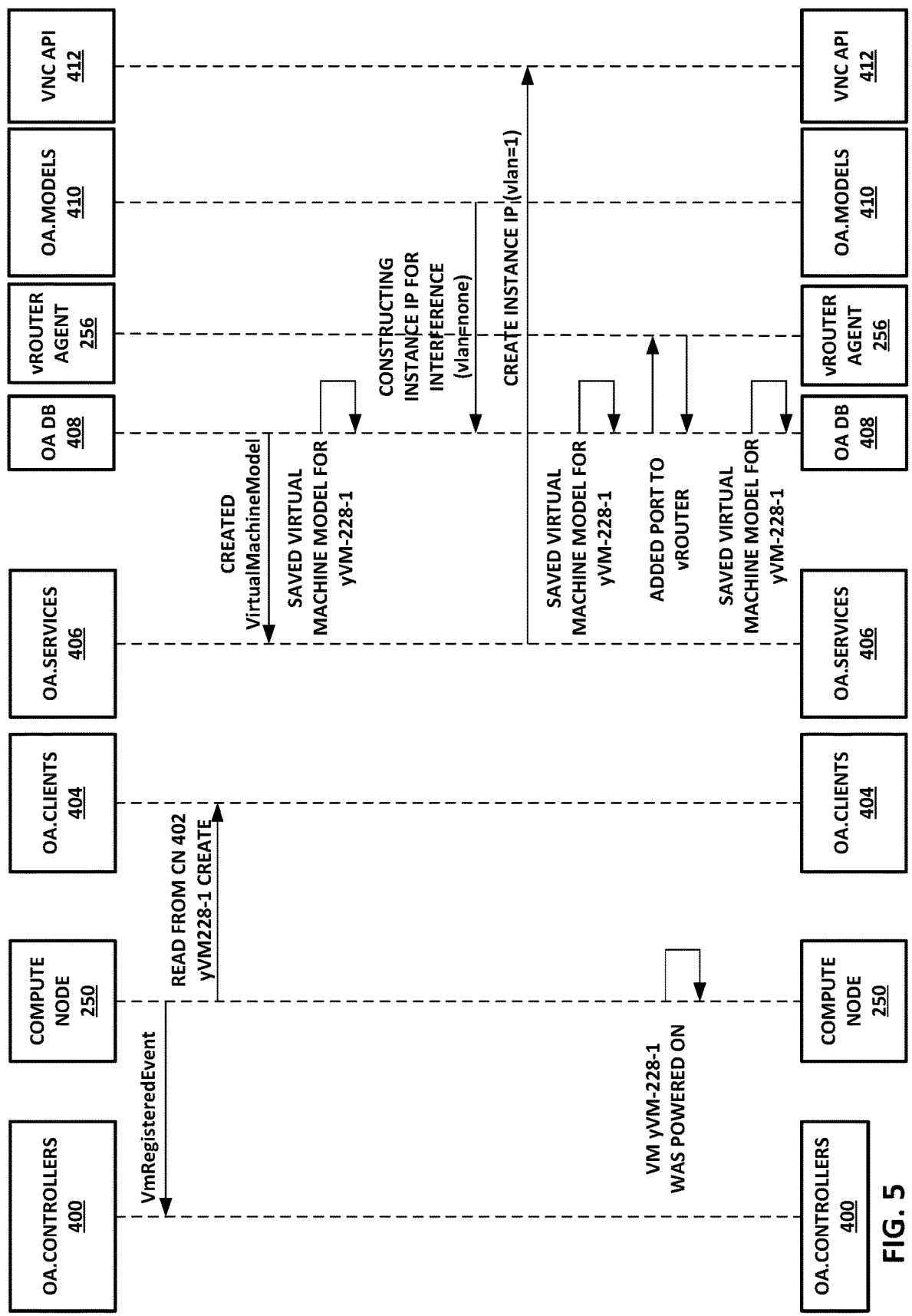
FIG. 5 is a flow diagram illustrating an example operation of a network device in accordance with the techniques of the disclosure.

FIG. 5 is a flow diagram illustrating an example operation of a network device in accordance with the techniques of the disclosure. FIG. 5 shows operation of the orchestration agent during virtual machine creation. The orchestration agent may be any of orchestration agents 17A, 207, 257 of FIGS. 1-4, for example.

The virtual machine creation event is being pushed by compute node 250, specifically by virtualization platform 259A to the OA.Controllers thread 400 that is listening for the events. For example, OA.Controllers thread 400 may subscribe to events published by compute node 250. Compute node 250 may represent any of server 12A, computing device 200, for example.

In response to OA.Controllers thread 400 learning of an event, the OA.client thread 404 reads in the creation of that event from the compute node. In the example of FIG. 4, the event is a new virtual machine being created (creation of VM-228-1). OA.client thread 404 is the thread that makes changes to outside entities. OA.client thread 404 makes a connection to the network controller 254, to the Virtualization infrastructure management center represented by orchestrator 253, and to the compute node 250 via virtualization platform 259A. OA.Services thread 406 performs the work, such as creation of data models and data objects within the CVM database 408. For example, OA.Services thread 406 instructs virtual router agent 256 to create an instance IP address for a virtual machine, and virtual router agent 256 creates the instance IP address for the virtual machine in response to receiving the instructions. OA database 408 is where orchestration agent 257 configuration state is kept locally. OA.models thread 410 then constructs the instance IP for the new virtual machine. The instance IP is then confirmed with the controller 254 via a VNC API, e.g., the OA.client thread 404 updates controller 254 with the instance IP address via the API. OA.models thread 410 saves the instance IP in OA database 408, the VM is powered on, and the state of that virtual machine is saved in OA database 408.

Similar interactions between threads of orchestration agent 257 and external entities may occur for other event types. For example, when vrouter 260 migrates a virtual machine from a first IP address to a second IP address (e.g., the virtual machine is being moved from compute node 250 to a different compute node), orchestration agent 257 updates network controller 254 with the second IP address for the VM via the VNC API. As another example, when compute node 250 receives an indication that a virtual machine is registered and virtualization platform 259A notifies the orchestration agent that the virtual machine is registered, e.g., by virtue of OA.controllers thread 400 listening for such an event, the orchestration agent 257 receives network configuration data for a virtual network interface of the virtual machine, the network configuration data comprising a network address, e.g., by virtue of OA.clients 404 obtaining the network address from virtualization platforms 259A. The orchestration agent 257 causes the computing device to create the virtual machine and configure the virtual network interface based at least on the network configuration data.

In this manner, FIG. 5 provides an example of an orchestration agent of a computing device detecting configuration events from the computing device to determine local configuration state of the computing device, where the orchestration agent operates as an agent of an orchestrator for a computing infrastructure that includes the computing device. The orchestration agent aggregates the local configuration state from the computing device with configuration state for the computing device from a network controller to generate aggregated configuration state for the computing device, and stores the aggregated configuration state for application to operation of the computing device.

Figure 6:
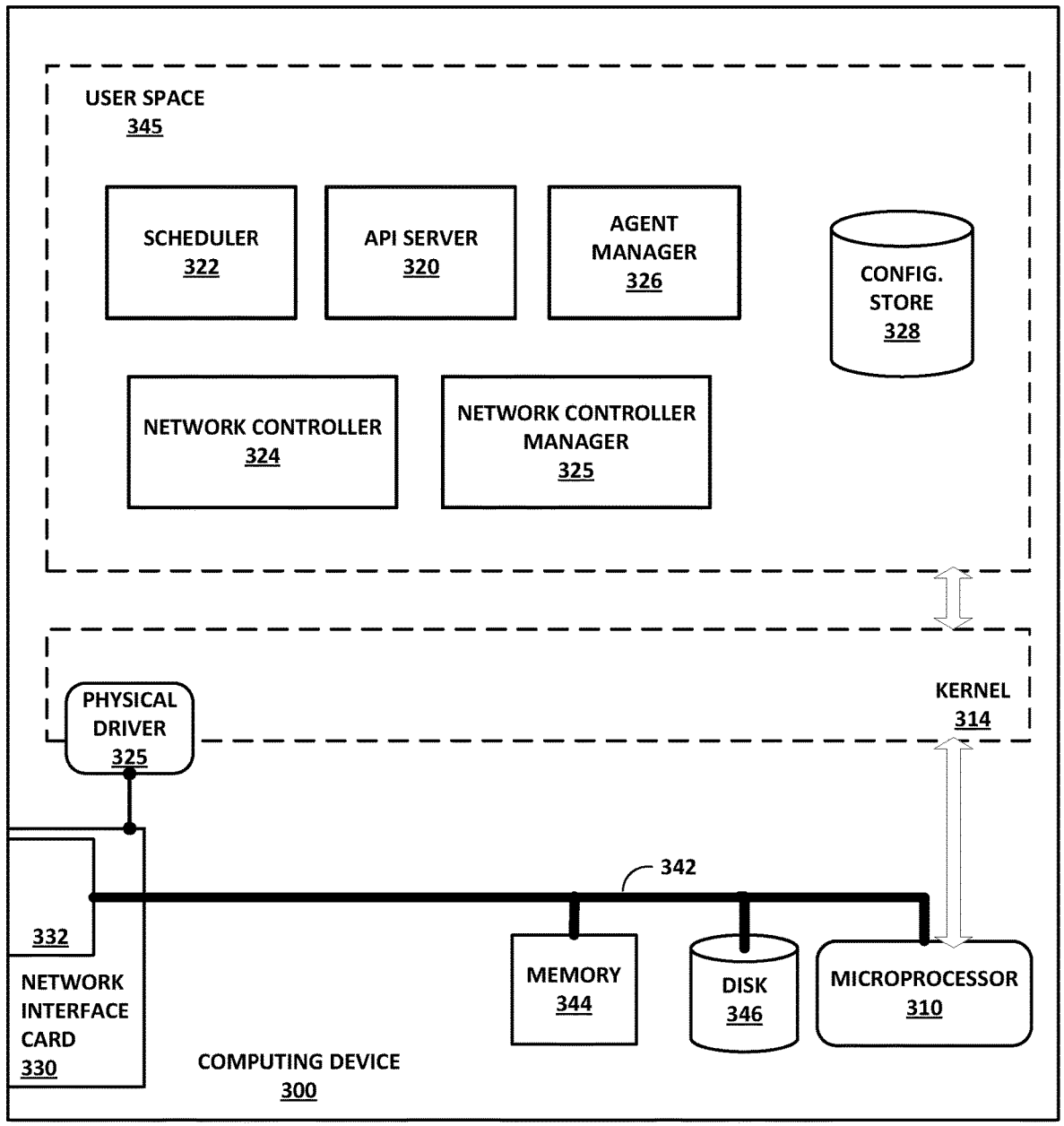
FIG. 6 is a block diagram of an example computing device according to techniques described in this disclosure.

FIG. 6 is a block diagram of an example computing device operating as an instance of controller for a virtualized computing infrastructure. Computing device 300 an example instance of controller 5 for a virtualized computing infrastructure. Computing device 300 of FIG. 6 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure hosts computing devices for hosting virtual machines orchestrated by computing device 300.

API server 320, scheduler 322, controller manager 326, and configuration store may implement a master node for a cluster and be alternatively referred to as "master components." The cluster may be a cluster of hosts for virtual machines.

API server 320 includes code executable by microprocessor 310. API server 320 may be one or more computer processes. API server 320 validates and configures data for objects, such as virtual execution elements (e.g., virtual machines). API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store.

Scheduler 322 includes code executable by microprocessor 310. Scheduler 322 may be one or more computer processes. Scheduler 322 monitors for newly created or requested virtual execution elements (e.g., virtual machines) and selects a host on which the virtual execution elements are to run. Scheduler 322 may select a host based on resource requirements, hardware constraints, software constraints, policy constraints, locality, etc.

In general, API server 320 may invoke the scheduler 322 to schedule a virtual execution element, which may select a host and returns an identifier for the selected host to API server 320, which may write the identifier to the configuration store 328 in association with the virtual execution element. API server 320 may invoke the orchestration agent 207 for the selected host, which may cause the container engine 208 for the selected host to obtain the virtual execution element from a storage server and create the virtual execution element on the host. The orchestration agent 207 for the selected host may update the status for the virtual execution element to the API server 320, which persists this new state to the configuration store 328. In this way, computing device 300 instantiates new virtual execution elements in the computing infrastructure 8.

Agent manager 326 includes code executable by microprocessor 310. Agent manager 326 may be an ESX agent manager, described herein. Agent manager 326 may be one or more computer processes. Agent manager 326 may embed the core control loops, monitoring a shared state of a cluster by obtaining notifications from API Server 320. Agent manager 326 may attempt to move the state of the cluster toward the desired state. Example controllers (not shown) managed by the agent manager 326 may include a replication controller, endpoints controller, namespace controller, and service accounts controller. Agent manager 326 may perform lifecycle functions such as virtual machine creation and lifecycle, event garbage collection, terminated virtual machine garbage collection, cascading-deletion garbage collection, node garbage collection, etc.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more hosts, such as servers 12.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization. Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors computing device 300 for new objects (e.g., virtual machines and services). Network controller manager 325 may isolate virtual machines in virtual networks and connect virtual machines with services.

Network controller manager 325 may be executed as a container of the master node for a cluster.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers. Various examples of computing device 300 may not include each of scheduler 322, API server 320, controller manager 326, or network controller manager 325.

Various components, functional units, and/or modules illustrated in FIGS. 1-4 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module.

Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 7:
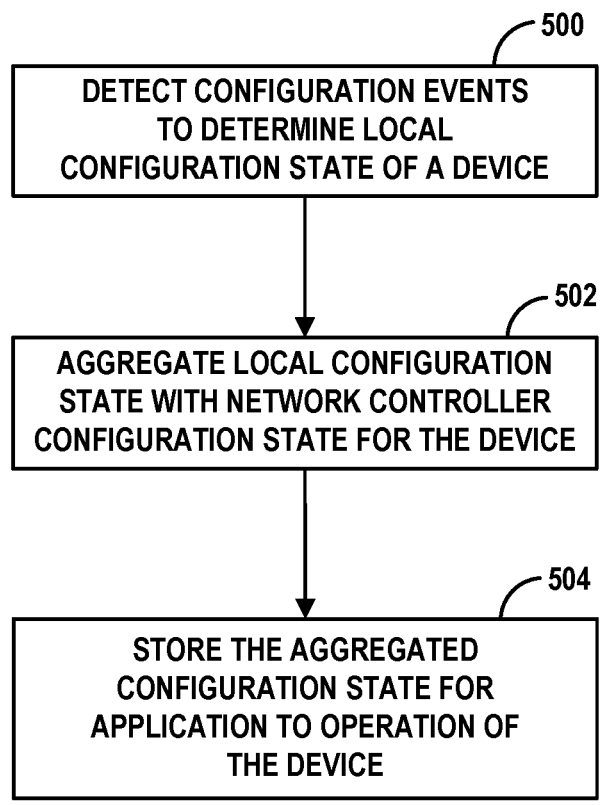
FIG. 7 is a flowchart illustrating example operation of a network device in accordance with the techniques of this disclosure.

FIG. 7 is a flowchart illustrating example operation of a network device in accordance with the techniques of this disclosure. Although FIG. 7 is described with respect to the example of FIGS. 3 and 4, the operation shown in FIG. 7 be performed by any orchestration agents described herein, including orchestration agent 17A and orchestration agent 207 of FIGS. 1 and 2, respectively. Orchestration agent 257 of a computing device detects configuration events from the computing device to determine local configuration state of the computing device (500). Orchestration agent operates as an agent of an orchestrator for a computing infrastructure that includes the computing device. For example, OA.Controllers thread 400 may subscribe to events published by compute node 250, and detect published events. In response to OA.Controllers thread 400 learning of an event, the OA.client thread 404 reads in the creation of that event from the compute node.

Orchestration agent 257 aggregates the local configuration state from the computing device with configuration state for the computing device from a network controller to generate aggregated configuration state for the computing device (502). For example, OA.client thread 404 makes a connection to the network controller 254, to the Virtualization infrastructure management center represented by orchestrator 253, and to the compute node 250 via virtualization platform 259A, to obtain information relevant to the creation of the event. OA.client thread 404 may also connect to vRouter agent 256, such as for VLAN assignments for a VM.

Orchestration agent 257 stores the aggregated configuration state for application to operation of the computing device. For example, OA.Services thread 406 creates data models and data objects within the CVM database 408 based on the configuration state and information learned from the external entities. OA.models thread 410 may save the instance IP and the state of that virtual machine is saved in OA database 408.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable pro-

What is claimed is:

1. A computing device comprising:
processing circuitry coupled to a memory device; and
an orchestration agent configured for execution by the processing circuitry, wherein the orchestration agent is an agent of an orchestrator for a computing infrastructure that includes the computing device, wherein the orchestration agent is configured to:
  detect configuration events from the computing device to determine local configuration state of the computing device, the configuration events including at least one of powering on a virtual machine, powering off a virtual machine, deletion of a virtual machine, registration of a virtual machine, or creation of a virtual machine;
  aggregate the local configuration state from the computing device with configuration state from a network controller to generate aggregated configuration state; and
  store the aggregated configuration state for application to operation of the computing device.

2. The computing device of claim 1, further comprising:
a virtual router comprising a virtual routing and forwarding instance for a virtual network,
wherein the orchestration agent is configured to instruct the virtual router to create an instance Internet Protocol (IP) address for a virtual machine of the network device,
wherein the virtual router is configured to create the instance IP address for the virtual machine in response to receiving the instructions, and
wherein the orchestration agent is configured to send, via an application programming interface, an update to a network controller indicating the instance IP address.

3. The computing device of claim 2,
wherein the virtual router migrates the virtual machine from a first IP address to a second IP address,
wherein the orchestration agent sends, via the application programming interface, an update to the network controller indicating the second IP address for the virtual machine.

4. The computing device of claim 2, further comprising:
a virtual router agent for the virtual router, wherein the virtual router agent is an agent for the network controller, the virtual router agent configured for execution by the processing circuitry, wherein the virtual router agent is configured to receive virtual network configuration data for configuring the virtual router to implement the virtual network.

5. The computing device of claim 1,
wherein the orchestration agent is configured to output, to the network controller, network configuration data for a virtual network interface of a virtual machine to update network configuration state for the computing infrastructure.

6. The computing device of claim 1,
wherein the computing device receives an indication that a virtual machine is registered and notifies the orchestration agent that the virtual machine is registered,
wherein the orchestration agent is configured to receive network configuration data for a virtual network interface of the virtual machine, the network configuration data comprising a network address,
wherein the orchestration agent is configured to cause the computing device to create the virtual machine and configure the virtual network interface based at least on the network configuration data.

7. The computing device of claim 1,
wherein the computing device executes a bare metal hypervisor that supports one or more virtual machines that are members of one or more virtual networks,
wherein a particular virtual machine of the one or more virtual machines hosts a container for the orchestration agent.

8. The computing device of claim 1, wherein one or more of the configuration events comprise events initiated by a virtualized infrastructure management system.

9. The computing device of claim 1, wherein the orchestration agent is configured to detect configuration events from the computing device to determine local configuration state by, in response to detecting a configuration event, obtaining the local configuration state associated with the configuration event from a virtualization platform of the computing device.

10. A method comprising:
detecting, by an orchestration agent of a computing device, configuration events from the computing device to determine local configuration state of the computing device, the configuration events including at least one of powering on a virtual machine, powering off a virtual machine, deletion of a virtual machine, registration of a virtual machine, or creation of a virtual machine, wherein the orchestration agent operates as an agent of an orchestrator for a computing infrastructure that includes the computing device;
aggregating, by the orchestration agent, the local configuration state from the computing device with configuration state for the computing device from a network controller to generate aggregated configuration state for the computing device; and
storing, by the orchestration agent, the aggregated configuration state for application to operation of the computing device.

11. The method of claim 10, wherein detecting configuration events from the computing device to determine local configuration state comprises:
in response to detecting a configuration event, obtaining, by the orchestration agent, the local configuration state from a virtualization platform of the computing device.

12. The method of claim 10, further comprising:
sending, by the orchestration agent and to the network controller via an application programming interface in response to receiving an indication that a virtual router of the computing device has migrated a virtual machine of the computing device from a first Internet Protocol (IP) address to a second IP address, an update indicating the second IP address for the virtual machine.

13. The method of claim 10, further comprising outputting, by the orchestration agent to the network controller, network configuration data for a virtual network interface of a virtual machine to update network configuration state for the computing infrastructure.

14. The method of claim 10, further comprising:
- receiving, by the orchestration agent, an indication that a virtual machine is registered,
- receiving, by the orchestration agent, network configuration data for a virtual network interface of the virtual machine, the network configuration data comprising a network address, and
- invoking, by the orchestration agent, the computing device to create the virtual machine and configure a virtual network interface based at least on the network configuration data.

15. The method of claim 10, wherein the orchestration agent comprises a plugin module executing on the computing device.

16. The method of claim 10, wherein one or more of the configuration events comprise events initiated by a virtualized infrastructure management system.

17. A system comprising:
- an orchestrator for a virtualized computing infrastructure, the virtualized computing infrastructure comprising virtual execution elements executing on a plurality of computing devices;
- a network controller to configure one or more virtual networks for the virtualized computing infrastructure;
- a first computing device of the plurality of computing devices, the first computing device comprising:
  - first processing circuitry coupled to a first memory device;
  - a first bare metal hypervisor configured to host first one or more virtual machines;
  - a first virtual router agent that receives first virtual network configuration data for configuring a first virtual router to implement a first virtual network of the one or more virtual networks, wherein the first virtual router agent is an agent for the network controller; and
  - a first orchestration agent configured for execution by the first processing circuitry, wherein the first orchestration agent is configured to receive first virtual machine information from the orchestrator and to send, to the network controller, first virtual network information for at least one of respective virtual machine interfaces of the first one or more virtual machines; and
- a second computing device of the plurality of computing devices, the second computing device comprising:
  - second processing circuitry coupled to a second memory device;
  - a second bare metal hypervisor configured to host second one or more virtual machines;
  - a second virtual router agent that receives second virtual network configuration data for configuring a second virtual router to implement the first virtual network of the one or more virtual networks, wherein the second virtual router agent is an agent for the network controller; and
  - a second orchestration agent configured for execution by the second processing circuitry, wherein the second orchestration agent is configured to receive second virtual machine information from the orchestrator and to send, to the network controller, second virtual network information for at least one of respective virtual machine interfaces of the second one or more virtual machines.

18. The system of claim 17,
- wherein a virtual machine of the first one or more virtual machines executes the first virtual router, and
- wherein the virtual machine of the first one or more virtual machines hosts the first orchestration agent.

19. The system of claim 18,
- wherein the virtual machine of the first one or more virtual machines hosts the first virtual router agent.

20. The system of claim 17, wherein the first orchestration agent is configured to:
- detect configuration events from the first computing device to determine local configuration state of the first computing device, the configuration events including at least one of powering on a virtual machine of the first one or more virtual machines, powering off a virtual machine of the first one or more virtual machines, deletion of a virtual machine of the first one or more virtual machines, registration of a virtual machine of the first one or more virtual machines, or creation of a virtual machine of the first one or more virtual machines;
- aggregate the local configuration state from the first computing device with configuration state received from the network controller to generate aggregated configuration state; and
- store the aggregated configuration state for application to operation of the first computing device.

* * * * *